United States Patent

[11] 3,573,772

[72] Inventor Richard E. Anderson
     Lynn, Mass.
[21] Appl. No. 742,631
[22] Filed July 5, 1968
[45] Patented Apr. 6, 1971
[73] Assignee General Electric Company

[54] CONDITION RESPONSIVE INDICATING INSTRUMENT
5 Claims, 9 Drawing Figs.

[52] U.S. Cl. .................................................. 340/187,
                                                          116/129
[51] Int. Cl. ................................................. G09f 9/00
[50] Field of Search .......................................... 340/187,
                                27, 316, 317, 326; 116/129 (A,B)

[56] References Cited
UNITED STATES PATENTS

| | | | |
|---|---|---|---|
| 2,433,541 | 12/1947 | Bevins .......................... | 116/129A |
| 3,041,997 | 7/1962 | Hartwell ....................... | 116/129A |
| 3,448,449 | 6/1969 | Schulz et al. ................. | 340/187X |

*Primary Examiner*—Stanley M. Urynowicz, Jr.
*Attorneys*—Richard E. Hosley, Frank L. Neuhauser, Oscar B. Waddell and Melvin M. Goldenberg ABSTRACT: A condition indicating instrument with an extreme condition recorder. A rotatable, magnetized rotor with a pointer affixed thereto is engaged by a condition indicating drive mechanism to be rotated from an original position to an extreme condition position. A pair of spring-biased pivoted members normally act as brakes on the rotor. An electromagnet is energized to release the braking force and produce, in conjunction with the pivoted members, magnetic poles which react with magnetic poles on the rotor to return the rotor toward its original position.

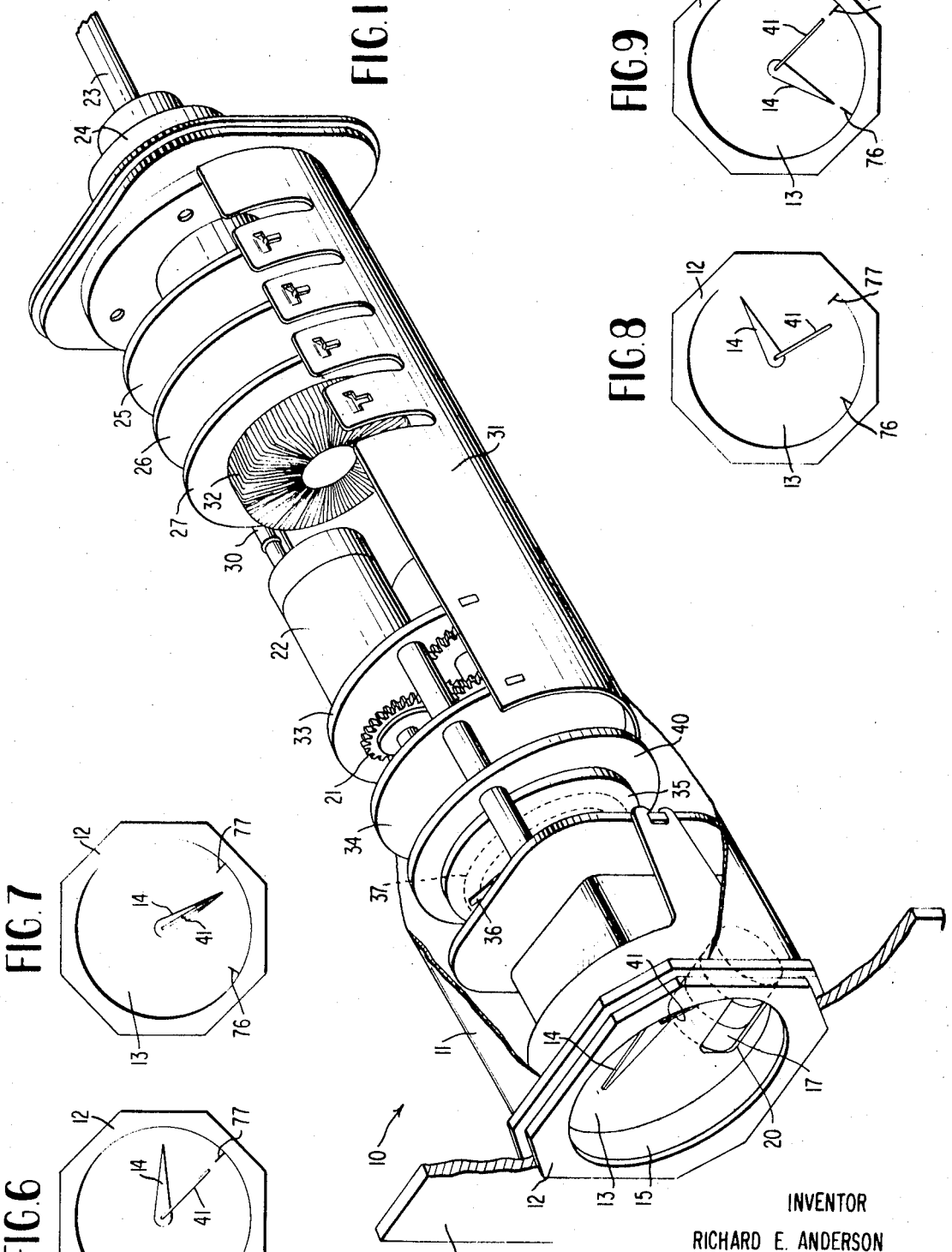

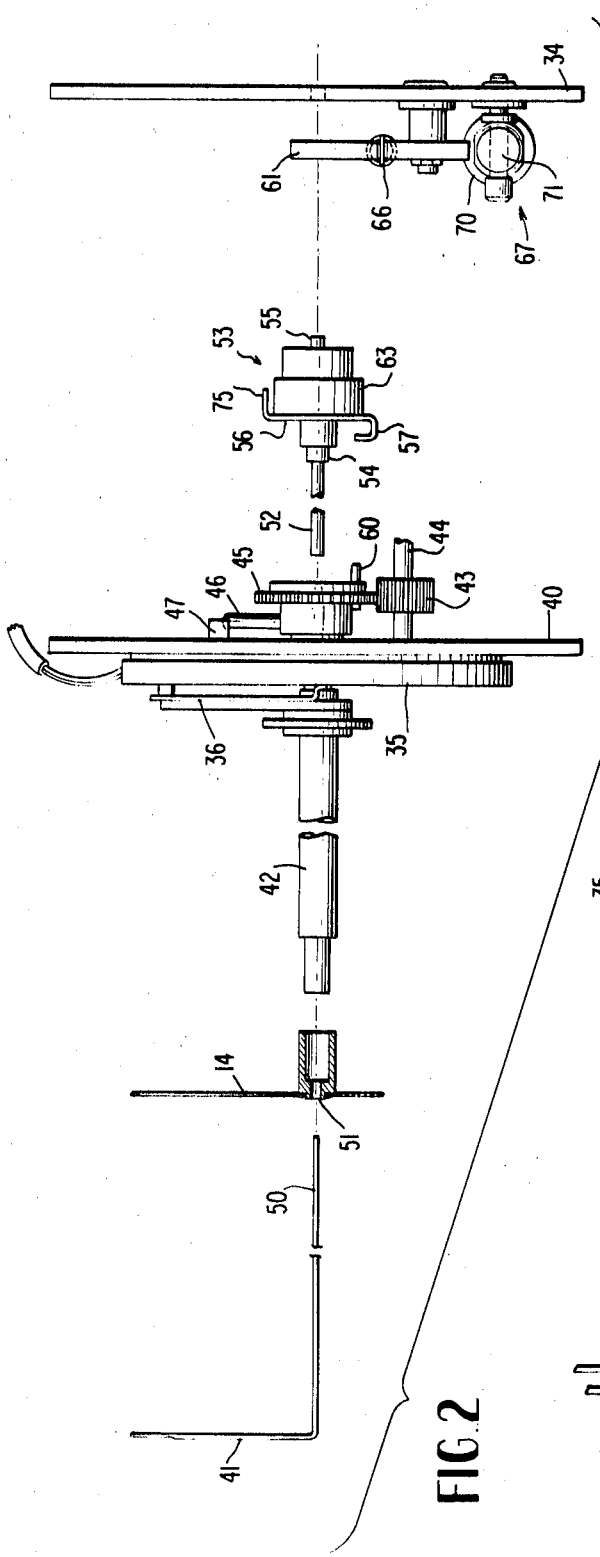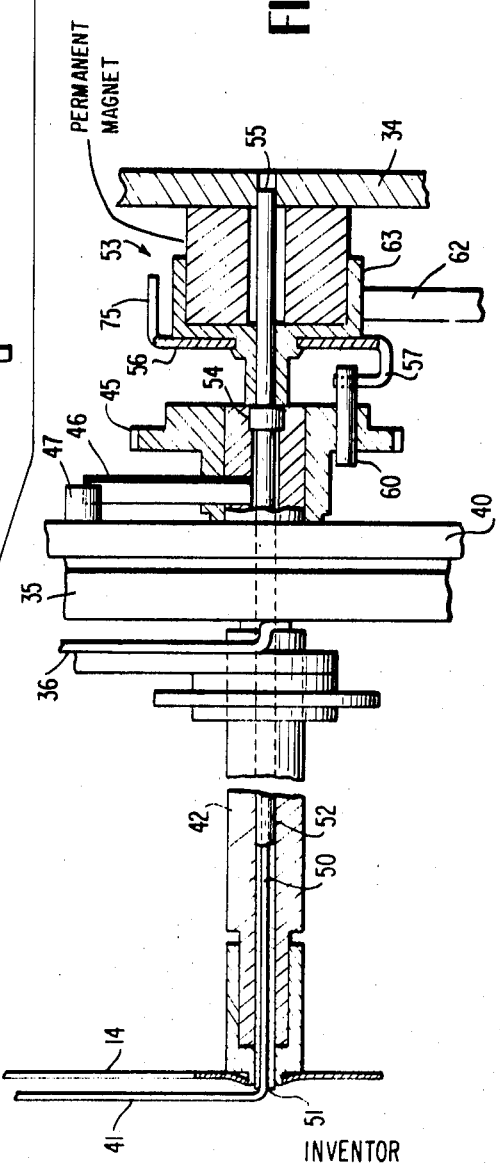

INVENTOR
RICHARD E. ANDERSON
BY Richard E. Hosley
ATTORNEY

CONDITION RESPONSIVE INDICATING INSTRUMENT

BACKGROUND OF THE INVENTION

This invention relates to condition responsive indicating instruments and more specifically to a means for recording the value of an extreme condition.

Whenever it is necessary to monitor and display condition values, it is often desirable to accurately record and display extreme condition values without interfering with the instantaneous display under operating conditions. Such a recordation may then be used for various purposes. For example, a number of conditions are monitored in jet engines. Two of these conditions, engine turbine speed and exhaust gas temperature, have values which normally lie within a safe operating range. If these safe operating ranges are exceeded, certain maintenance procedures must be instituted to assure the reliability of the engine.

Therefore, it is an object of this invention to provide a condition responsive indicating instrument including an extreme condition recording means.

Another object of this invention is to provide such a recording means which gives both qualitative and quantitative information.

Still another object of this invention is to provide such a recording means adapted for quick resetting only by authorized personnel.

Yet another object of this invention is to provide such a recording means which does not interfere with the normal operation of the condition responsive indication instrument.

SUMMARY

In accordance with one aspect of this invention, condition responsive indicating means engage and displace an extreme condition indicating means from an original position notwithstanding a frictional force exerted by releasable braking means. When it is desired to return the extreme condition means to its original position, a magnetic circuit, comprising elements of the extreme condition indicating means and the releasable braking means, is activated.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 1 is a perspective view of an indicating instrument which incorporates this invention;

FIG. 2 is an exploded view of a portion of the indicating instrument shown in FIG. 1 to illustrate the elements of the extreme condition indicating means;

FIG. 3 is a cross-sectional view of a portion of the assembled elements shown in FIG. 2;

FIGS. 6 through 9 illustrate different displays provided by the indicating instrument under various conditions.

DESCRIPTION OF AN ILLUSTRATIVE EMBODIMENT

Figure 5:
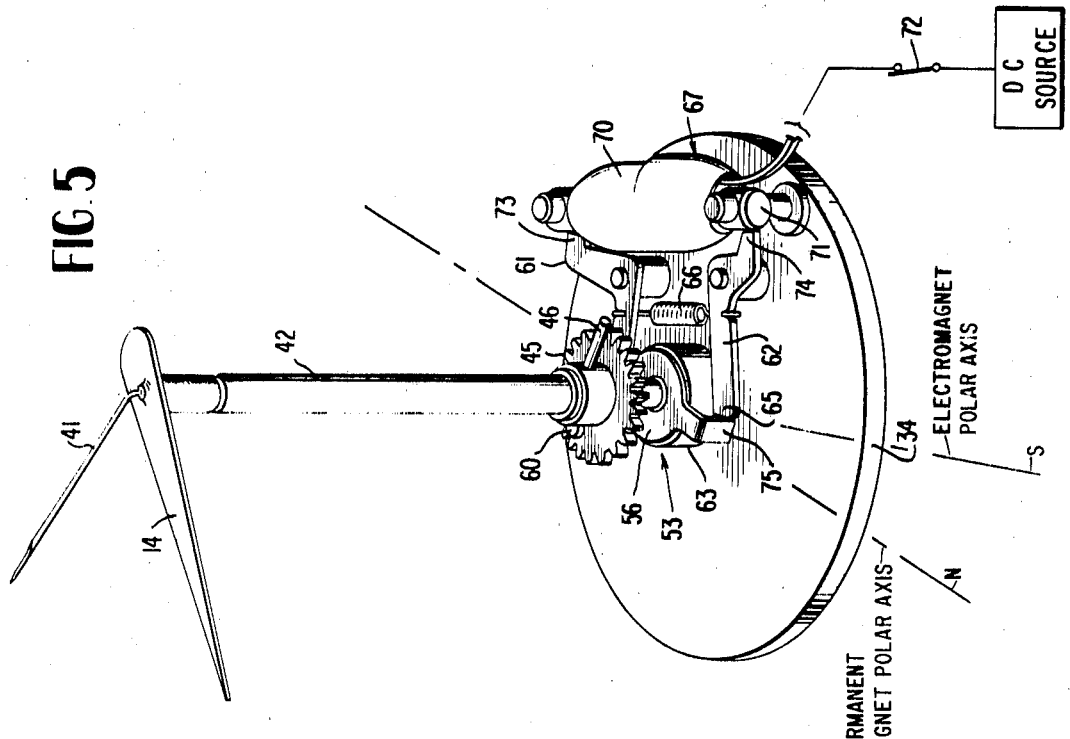
FIGS. 4 and 5 present details of the extreme condition indicating means in two operative positions.

Referring to the FIGS. where like numerals refer to like elements throughout, one embodiment of a condition responsive indicating instrument generally designated by numeral 10 is shown in FIG. 1 with most of its housing 11 removed. Such an instrument generally includes a visible portion including a flange 12, a scale plate 13, a condition indicating pointer 14 and a transparent dial face 15 over the scale plate 13 and the indicating pointer 14. This assembly is mounted on the front surface of a panel 16. These elements constitute a condition indicating instrument which provides a reading when the indicating pointer 14 is driven along the scale plate 13 in response to a driving signal.

Means for providing the driving signal are disposed behind the panel 16 and within the housing 11. As various means for driving the indicating pointer 14 and circuitry and mechanical elements for such a system are known in the art, they are only shown in outline. The indicating pointer 14 and a counter 17, disposed behind the scale plate 13 and visible through an aperture 20, are driven through a gear mechanism 21 by a servomotor 22. The servomotor 22 is driven in response to sensor signals coupled to the indicating instrument 10 by a cable 23 which is attached to a connector assembly 24 and then coupled to electronic circuits formed on a plurality of printed circuit boards 25, 26 and 27 interconnected by internal cable means 30 and maintained in position by a support means 31.

As specifically illustrated in FIG. 1, a power transformer 32 is mounted to the circuit board 27; and this is connected through the cable means 30 and circuitry on the printed circuit boards to the servomotor 22 which is mounted on a support plate 33. The servomotor 22 drives a shaft to turn the indicating pointer 14 through the gear mechanism 21 which is mounted between the support plates 33 and 34. A position sensitive potentiometer 35, including a slider 36 coupled to the shaft and a resistive element 37, is mounted on a support plate 40 to produce a balancing feedback signal for the servometric positioning system.

In accordance with this invention, an extreme condition indicating pointer 41 is also visible from the front side of the panel 16. This pointer 41 is driven by a mechanism which is located between the support plates 34 and 40 and which is shown in more detail in FIGS. 2 through 5. As described above, the condition indicating pointer 14 is driven through a gear mechanism by means of a hollow shaft 42 to which the condition indicating pointer 14 is affixed. A pinion 43, connected to an output shaft 44 from the gear mechanism 21, meshes with a gear 45 on the hollow shaft 42. FIGS. 2 and 3 specifically illustrate the relationship of the support plates 34 and 40 and the servo potentiometer 35 with its slider 36 connected to the shaft 42. Rotation of the shaft 42 is physically limited by interference between a pin 46 radially extending from a portion of the gear 45 and a stop 47 mounted to the support plate 40.

The extreme condition indicating pointer 41 is formed as a radial extension of a fine wire member 50 which extends axially through an apertured bearing 51 in the condition indicating pointer 14 to be spaced radially therefrom. This fine wire member 50 extends coaxially inside the hollow shaft 42 and is frictionally engaged by another hollow shaft 52 which is connected to a rotor assembly 53 and is supported in part by the bearing 51. The rotor assembly 53 has a bearing portion 54 adapted to be seated in a complementary portion formed in the gear 45. Another bearing portion 55 is adapted to be seated in a bearing means on the support plate 34. Therefore, the rotor assembly 53 is free to rotate with respect to the support plates 34 and 40 and also the hollow shaft 42.

Rotation of the extreme condition indicating means is effected by interengagement with the condition indicating means through a unidirectional driving connection. Although many such driving means may be incorporated in such an indicating instrument, only one specific embodiment is illustrated. A collar 56, which is an integral part of the rotor assembly 53, includes an axially extending tab 57. An axially extending pin 60 is mounted to the gear 45. As the shaft gear 45 rotates in this embodiment, the extreme condition indicating pointer 41 will also be rotated. Reverse motion of the shaft gear 45 does not affect the extreme condition indicating pointer 41. However, such reverse motion could be coupled by interchanging the relative positions of the tab 57 and the pin 60. Hence, the extreme condition indicating means is adapted to be moved from an original position to indicate an extreme condition by the condition indicating means.

After the rotor assembly is displaced from its original position to another position indicating an extreme condition, it is maintained in that position by a releasable braking means. As specifically shown in FIG. 4, a pair of pivoted members 61 and 62 are mounted to the support plate 34. They may be rotated into engagement with a main cylindrical portion 63 of the rotor assembly 53. If the pivoted members 61 and 62 are biased into the main cylindrical rotor portion 63, then sufficient frictional braking force can be exerted by tangential end portions 64 and 65 to prevent rotation of the rotor assembly 53 and the extreme condition indicating pointer 41 when the instrument is subjected to vibration and shock. One example of a biasing means is a spring 66. Proper choice of the bias means and braking means permits unencumbered operation of the condition indicating pointer 14 and its driving mechanism and also of the extreme condition indicating pointer 41. However, once driven to an extreme condition, the pointer 41 is maintained in that position until it is purposely returned to its original position.

Figure 4:
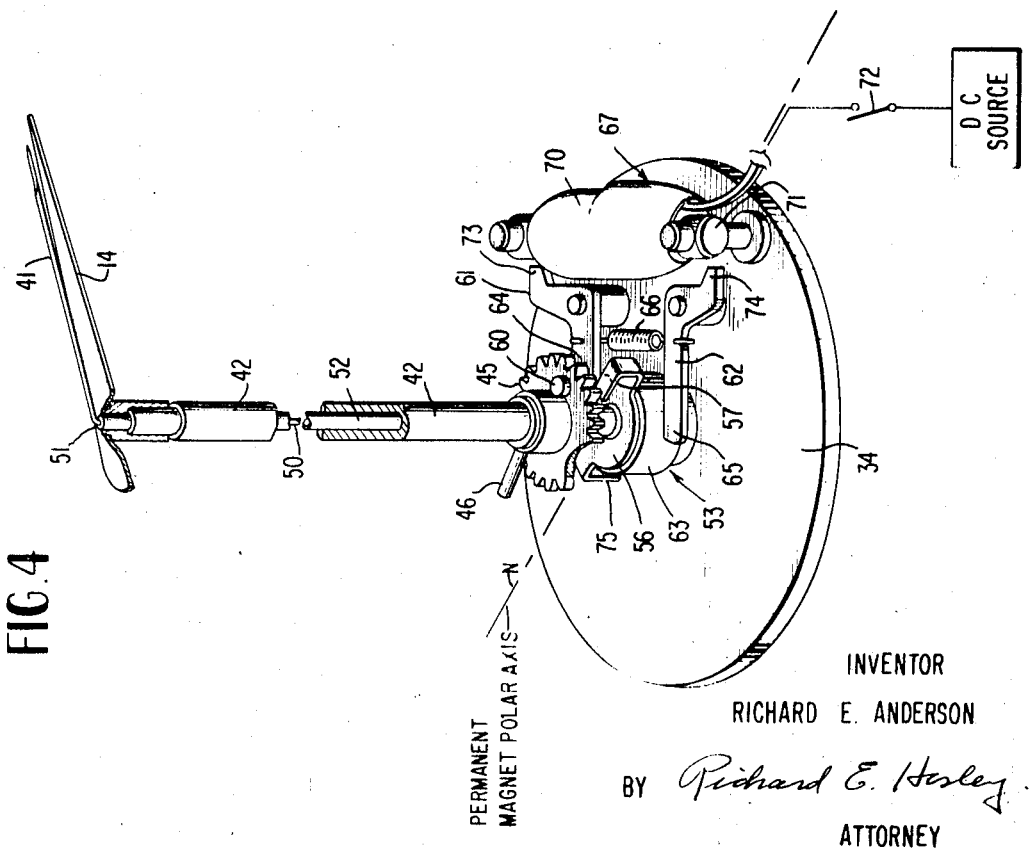

An electromagnet 67 is also mounted to the support plate 34 and comprises a coil 70 and a core 71. The coil 70 may be selectively connected to a direct current source by a switch 72. As is shown in FIG. 4, the core 71 normally terminates closely adjacent to end portions 73 and 74 of the pivoted members 61 and 62. In this specific embodiment, the cylindrical rotor portion 63 is formed by nesting a cylindrical magnet in an annular aluminum cup. The field produced by the permanent magnet is attenuated by the aluminum cup so it is not sufficient to overcome the frictional braking force exerted by the pivoted braking members 61 and 62 by interaction therewith.

Energization of the coil 70 with a direct current produces a magnetic field and attracts the juxtaposed end portions 73 and 74 into contact with the core 71. In addition to eliminating the braking force on the cylindrical rotor portion 63, this motion causes the pivoted members 61 and 62 to become magnetic pole extensions of the electromagnet 67. The resulting interacting fields cause the rotor assembly to return toward a position of magnetic equilibrium. Proper selection of the coil polarity and the magnet polarity will cause this movement of the pivoted members 61 and 62 to permit the rotor assembly 53 to return toward its original position.

If no stop means were incorporated in the mechanism, the rotor assembly 53 would stop when its north pole was aligned with the south pole defined by one end portion. In the particular embodiment shown in FIGS. 4 and 5 a second tab 75, integrally formed with the collar 56, extends axially toward the supporting plate 34. As the rotor assembly 53 returns toward a magnetically stable orientation, the tab 75 engages the end portion 65. The collar 56 and the cylindrical rotor portion 63 are oriented so that motion stops while the electromagnetic and permanent magnet polar axes are angularly displaced. This tends to keep the tab 75 seated against the pivoted member 62 during normal operation to assure that no overlimit or extreme conditions are erroneously recorded.

To clarify the operation of the condition indicating instrument with a maximum overlimit arrangement, reference is made to FIGS. 6 through 9. Under normal operating conditions, the condition indicating pointer 14 is advanced from a zero mark 76 while the extreme condition pointer 41 is at a minimum position indicated by a 100 percent mark 77 on the scale plate 13. If during operation the condition being measured exceeds a maximum allowable value, the condition indicating pointer 14 advances beyond the 100 percent mark 77 and carries the extreme condition pointer 41 with it. This is illustrated in FIG. 7. When the overlimit condition subsides, the condition indicating pointer 14 returns to the normal range between the zero mark 76 and the 100 percent mark 77. As shown in FIG. 8, the extreme condition indication pointer 41 remains at the highest or extreme condition value to thereby provide both qualitative and quantitative information. This information is permanently recorded and easily recognized. However, no interference with operation of the condition indicating pointer 14 has occurred. If access to the resetting mechanism is limited so only authorized personnel can energize the electromagnet coil, operation of the monitored equipment in the overlimit range is readily ascertained so proper procedures can be instituted to correct for such operation. While resetting may be limited to authorized personnel, the resetting operation is facilitated by an instrument constructed in accordance with this invention.

While only a single illustrative embodiment adapted for indicating a maximum overlimit condition has been described, it will be obvious that many modifications may be made to this invention. For example, the relative positions of the rotor assembly 53, the extreme condition pointer 41, the tab 57 and the pin 60 may be varied to provide a maximum condition, a minimum condition or negative maximum overlimit condition indicating means. Different indicating means, braking means, brake release means and means for driving the extreme condition pointer may be substituted for the specific elements and embodiment discussed herein. Further, the cylindrical magnet in the rotor assembly can be replaced with any magnetically reactive member such as a bar magnet or, where rotation is less than $\pi°$, a bar of magnetizable material such as steel. Therefore, it is the object of the appended claims to cover all such modifications and variations as come within the true spirit and scope of this invention.

I claim:

1. In an instrument assembly including condition responsive indicating means for displaying a range of condition values, the improvement of means mounted to said instrument assembly for recording extreme condition values comprising:
   a. Extreme condition indicating means including a magnetically reactive rotor having north and south poles and being adapted for rotation from an original position to a maximum position by the condition responsive means;
   b. Releasable braking means normally exerting a frictional braking force on said rotor to retain said extreme condition indicating means at a position indicating the extreme condition value, said braking means including magnetically conducting portions; and
   c. Brake release means including selectively energizable magnetic field generating means for releasing said braking means, said energizable magnetic field means when energized being in flux exchange relationship with said magnetically conducting portions (and said magnetically reactive rotor, producing) to establish magnetic north and south poles in said magnetically conducting portions which are displaced from poles produced on said rotor, the magnetic fields established by the displaced north and south poles of said rotor and said magnetically conducting portions interacting to return said extreme condition indicating means toward its original position.

2. In an instrument assembly as recited in claim 1 wherein the condition responsive indicating means includes a first rotatable shaft, means for rotating the shaft in response to the condition and a condition indicating pointer operatively associated with a scale plate mounted to the instrument assembly, said extreme condition indicating means comprising a second shaft connected to said rotor and coaxial with the first shaft and an extreme condition indicating pointer connected to said second shaft, and said rotor being formed of a permanent magnet.

3. In an instrument assembly as recited in claim 2, said releasable braking means comprising a pair of spring-biased, pivoted members which tangentially engage said magnet rotor when said brake release means are deenergized, said pivoted members rotating in a plane transverse to a longitudinal axis through said rotor.

4. In an instrument assembly as recited in claim 3, said brake release means comprise an electromagnet juxtaposed to portions of said pivoted members, said pivoted members being rotatable into contact with said electromagnet and being composed of said magnetically conducting material.

5. In an instrument assembly as recited in claim 4 wherein said rotor includes stop means for engaging one of said pivoted members to thereby define an original position and said electromagnet having a coil adapted for connection to a direct current source, said rotor and said pivoted members being oriented so polar axes through said pivoted members and through said rotor are angularly displaced when the rotor is in its original position.

UNITED STATES PATENT OFFICE
CERTIFICATE OF CORRECTION

Patent No. 3,573,772     Dated April 6, 1971

Inventor(s) Richard E. Anderson

It is certified that error appears in the above-identified patent and that said Letters Patent are hereby corrected as shown below:

In Claim 1, line 39, delete "(and said magnetically" line 40 delete "reactive rotor producing)"

Signed and sealed this 7th day of March 1972.

(SEAL)
Attest:

EDWARD M. FLETCHER, JR.
Attesting Officer

ROBERT GOTTSCHALK
Commissioner of Patents